United States Patent [19]
Kubota et al.

[11] Patent Number: 4,630,501
[45] Date of Patent: Dec. 23, 1986

[54] STEERING SWITCH PAD APPARATUS

[75] Inventors: Kazuhisa Kubota; Takafumi Ichikawa, both of Aichi, Japan

[73] Assignee: Kabushiki Kaisha Tokai Rika Denki Seisakusho, Aichi, Japan

[21] Appl. No.: 665,876

[22] Filed: Oct. 29, 1984

[30] Foreign Application Priority Data

Oct. 28, 1983 [JP] Japan .......................... 58-167106[U]
Dec. 29, 1983 [JP] Japan .......................... 58-204077[U]
Dec. 29, 1983 [JP] Japan .......................... 58-204078[U]
Dec. 29, 1983 [JP] Japan .......................... 58-204079[U]

[51] Int. Cl.$^4$ .......................... B62D 1/04; B62D 1/16
[52] U.S. Cl. .................................... 74/484 R; 29/259; 74/492; 74/552; 180/78; 200/61.54; 339/3 S
[58] Field of Search .................. 74/484 R, 492, 552; 180/78; 29/259; 200/61.54; 339/3 S

[56] References Cited

U.S. PATENT DOCUMENTS 4,299,020 11/1981 Grego, Jr. .............................. 29/259
4,368,454 1/1983 Pilatzki .................................. 180/78
4,409,584 10/1983 Arima et al. .......................... 180/78

Primary Examiner—Allan D. Herrmann
Attorney, Agent, or Firm—Armstrong, Nikaido, Marmelstein & Kubovcik

[57] ABSTRACT

A steering switch pad apparatus is disclosed. It has a cam plate rotable together with a steering wheel, at least two pins movable in the axial direction according to the rotation of the cam plate, a pin holder having through-holes for guiding the pins, and a base having holes for receiving the pins therein. A part of the pins in the position where a boss plate passes are retreated into the pin holder and at least one pin in the other position are pushed forward into the corresponding hole of the base by the cam plate during the rotation of the steering wheel, so that the pin holder and the base are held in the relatively standstill state irrespective of the rotation of the steering wheel. A power transmission mechanism for the above is also disclosed.

6 Claims, 14 Drawing Figures

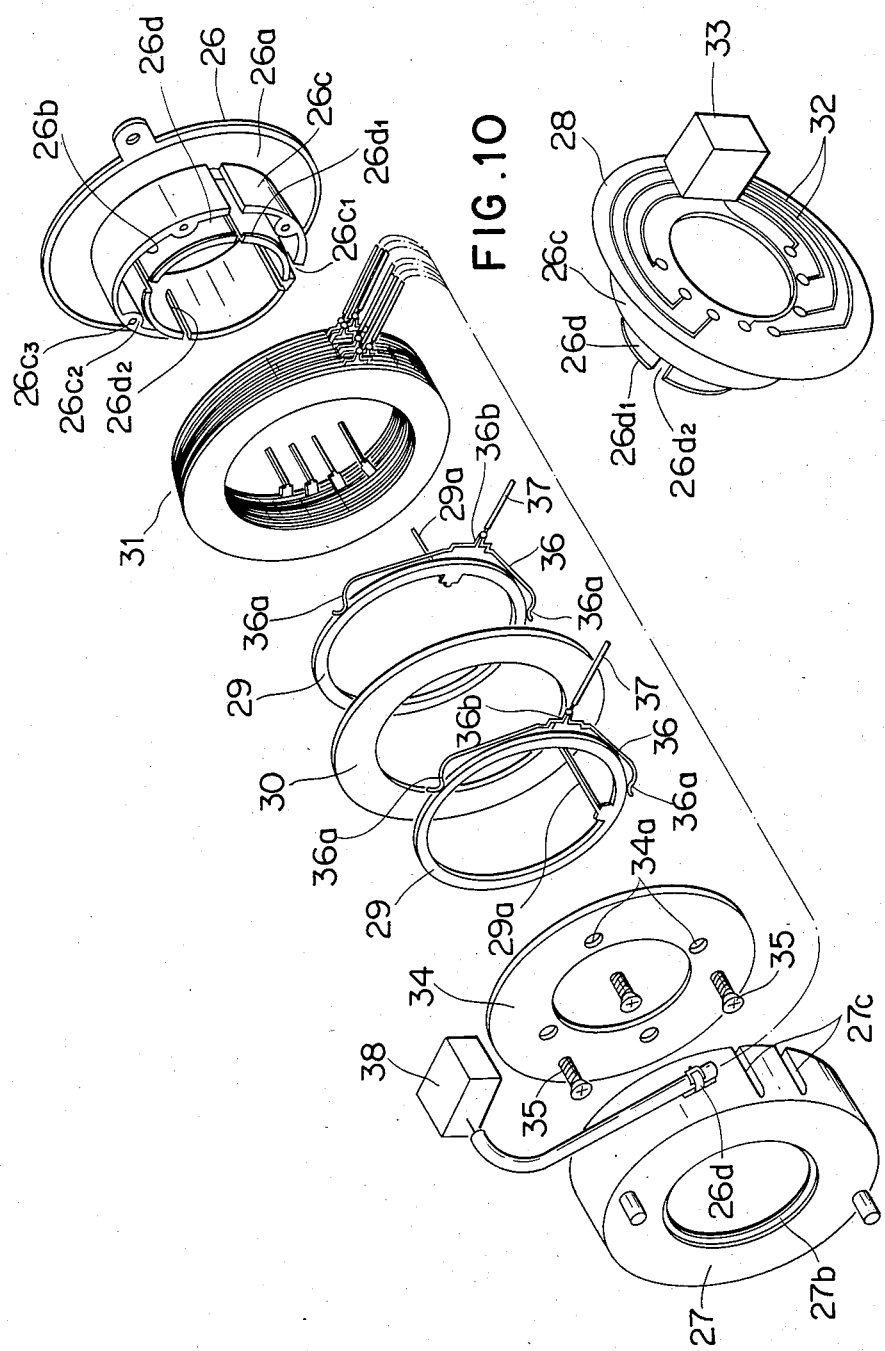

STEERING SWITCH PAD APPARATUS

BACKGROUND OF THE INVENTION

This invention relates to an improvement of a steering switch pad apparatus, and more particularly to an apparatus of the type having a power transmission mechanism for associating a steering column side to a steering pad including switches such as push button switches and display indication in such a manner as to keep the steering pad standstill even when the sterring wheel is rotated so that difficulties in operating switches and seeing the display indication due to the rotation of the steering pad together with the steering wheel can be prevented.

Heretofore, there is known a steering switch pad apparatus having a power transmission mechanism of this type as shown in FIGS. 1 and 2.

In the drawings, a steering shaft 1 is provided with a boss 3 which is fixedly attached to a boss plate 2a of a steering wheel 2. Said boss 3 is fastened to the steering shaft 1 by a nut 4. A pad base 7 of a steering pad 6 having push botton switches 5 and display thereon is rotatably fitted on the boss 3 and a C-ring 8 is provided in order to prevent the pad base 7 from coming off.

At more than two places in the steering column side, fixing pins 9 having slant surfaces 9a at the foremost end portions are reciprocatably received by pin holders 10. A spring 11 is stretched between each of the fixing pins 9 and pin holders 10, so that the fixing pin 9 is biased toward the pad base 7.

The pad base 7 is formed with a recess 7a in the position opposite to the pin holder 10. The foremost end portion of the fixing pin 9 is fitted in said recess 7a. Because of said fitting, rotation of the steering pad 6 is prevented.

The boss plate 2a is designed such as to be rotated traversing the fixing pin 9. The boss plate 2a is formed with a slant surface 2b at the portion which contacts the fixing pin 9, so that when the boss plate 2a hits the fixing pin 9, the fixing pin 9 can be easily pushed into the pin holder 10 through the slant surface 9a thereof.

Because of the above arrangement, when the fixing pin 9 is pushed into the pin holder 10 by the boss plate 2a, the steering wheel 2 becomes rotatable through that portion. However, since at least one of the fixing pins 9 are fitted in the recesses 7a of the pad base 7 at other portions, the steering pad 6 is normally kept standstill, even when the steering wheel 2 rotates.

Although the steering pad 6 is not rotated and kept standstill as mentioned above, everytime the boss plates 2a traverses the fixing pin 9 during the rotation of the steering wheel 2, the fixing pin 9 is urged to hit the pad base 7 due to the force of the spring 11. Therefore, such inconveniences as that hitting impact is transmitted to the driver, hitting sound is generated and that an unpleasant feeling is created since the rotary loads of the steering wheel 2 are increased everytime the slant surface 2b of the boss plate 2a hits the slant surface 9a of the fixing pin 9 are resulted, thereby jeopardizing smooth operation of the steering wheel.

The present invention is accomplished in order to remove the above disadvantages.

SUMMARY OF THE INVENTION

It is therefore an object of the present invention to provide a steering switch pad apparatus wherein loads applied to the steering wheel are maintained constant while in operation by means of providing normal contact between a cam and slide pins instead of such intermittent contact as seen in the prior art, so that such unpleasant feeling as inherent to the prior art can be removed and a smooth operation of the steering wheel can be obtained.

Another object of the invention is to provide a steering switch pad apparatus wherein either cam or slide pins is or are formed of a synthetic resin at the surface or surfaces in order to obtain a smoothly sliding relation therebetween and to avoid generation of scoring or extraordinary wear even when sufficient supply of lubricating agent is not available.

A further object of the invention is to provide a steering switch pad apparatus wherein the operative relation between the steering column side and the steering wheel side is kept unchanged even when the steering wheel is rotated.

In order to obtain the above objects or others, there is essentially provided a steering switch pad apparatus comprising a cam plate rotatable together with a steering wheel; at least two pins movable in the axial direction according to the rotation of said cam plate; a pin holder having through-holes for guiding said pins; and a base having holes for receiving said pins therein, a part of said pins in the position where a boss plate passes being retreated into the pin holder and at least one pin in the other position being pushed forward into the corresponding hole of said base by said cam plate, so that the pin holder and the base are held in the relatively standstill state irrespective of the rotation of the steering wheel.

There is also provided a steering switch pad apparatus comprising a steering pad equipped with switches, a steering wheel and a power transmission mechanism for associating the steering pad to the steering column side in order to hold the steering pad in the standstill state during the rotation of the steering wheel, wherein said power transmission mechanism comprises a first fixed member connected to the steering column side; a second fixed member connected to the steering pad; a plurality of coupling recesses formed in either one of said fixed members; a plurality of slide pins slidably provided in other fixed member in such a manner as to insert the tip portions thereof into said coupling recesses; and a cam which rotates according to the rotation of said steering wheel in order to slide said slide pins, the cam face of said cam and the contacting faces of said slide pins being formed in taper.

Many other advantages and features of the present invention will become manifest to those versed in the art upon making reference to the detailed description and the accompanying sheets of drawings in which preferred structural embodiments incorporating the principles of the present invention are shown by way of example.

BRIEF DESCRIPTION OF THE DRAWINGS

FIG. 9 is an exploded perspective view of a slip ring;

FIG. 10 is a perspective view of the above when viewed from a printed circuit board side;

DETAILED DESCRIPTION OF THE EMBODIMENTS

Preferred embodiments of the present invention will be described hereunder with reference to the accompanying drawings.

Figure 1:
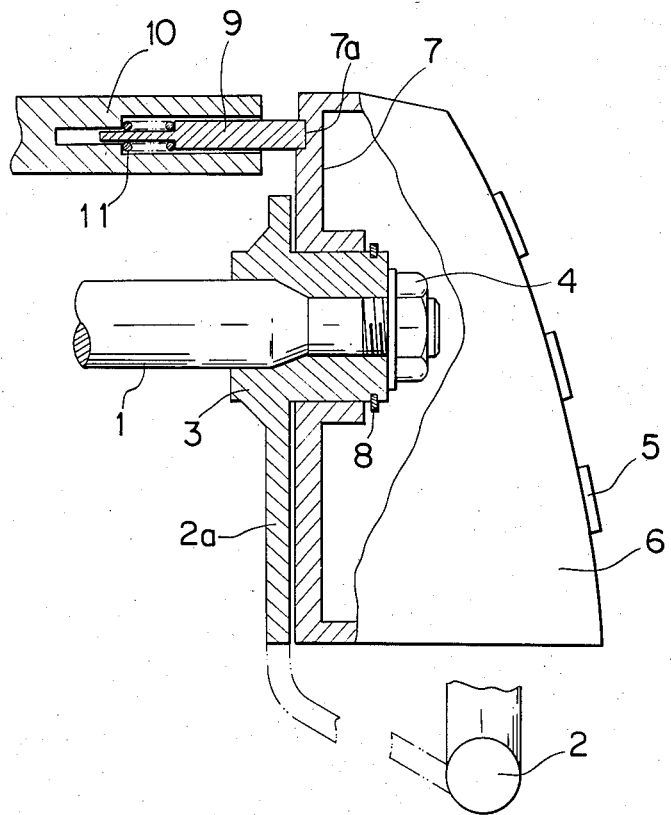
FIG. 1 is a vertical sectional view of a conventional steering switch pad apparatus.
Figure 2:
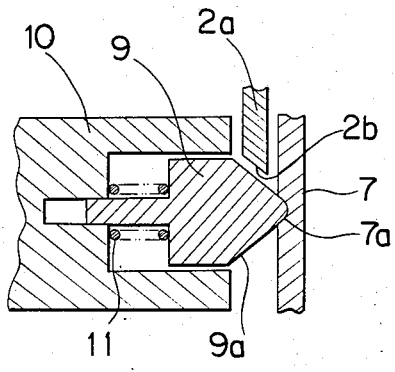
FIG. 2 is a cross sectional view of the above but showing only a portion which is material to the prior art apparatus.
Figure 3:
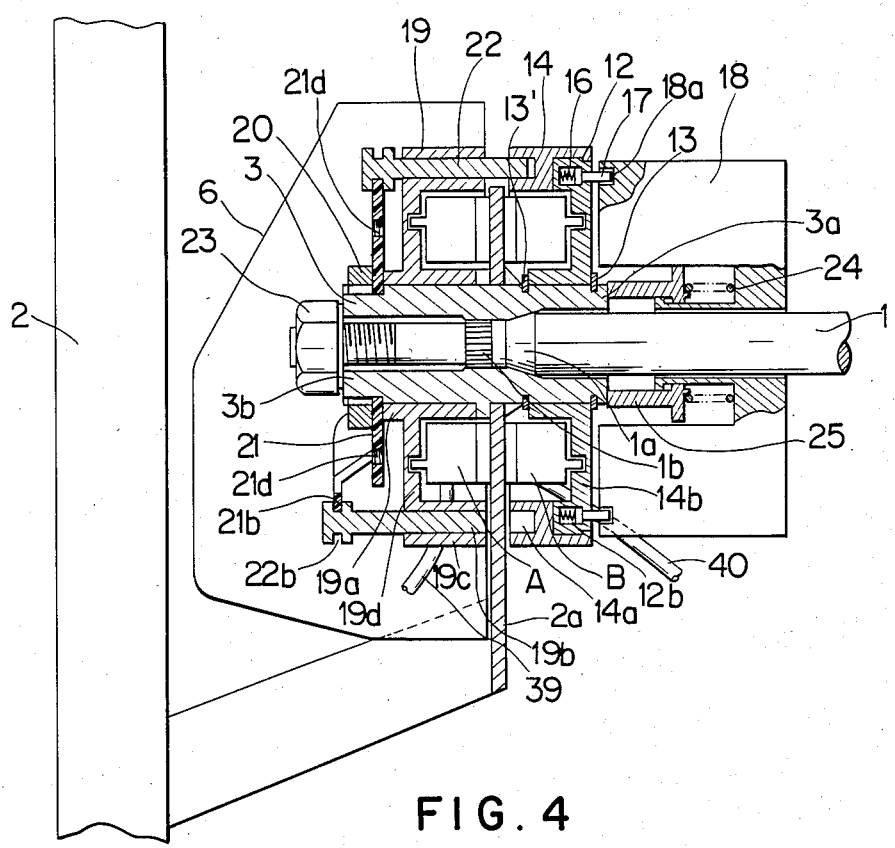
FIG. 3 is a vertical sectional view illustrating a first preferred embodiment of the present invention.
Figure 4:
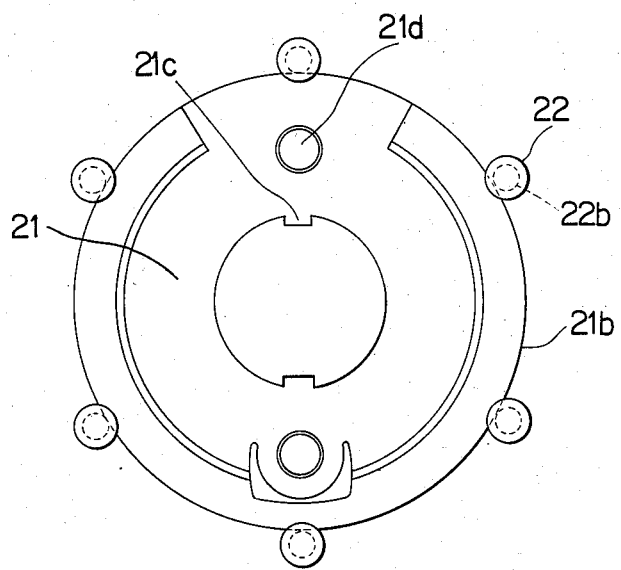
FIG. 4 is a front view illustrating a cam plate portion of the above.
Figure 5:
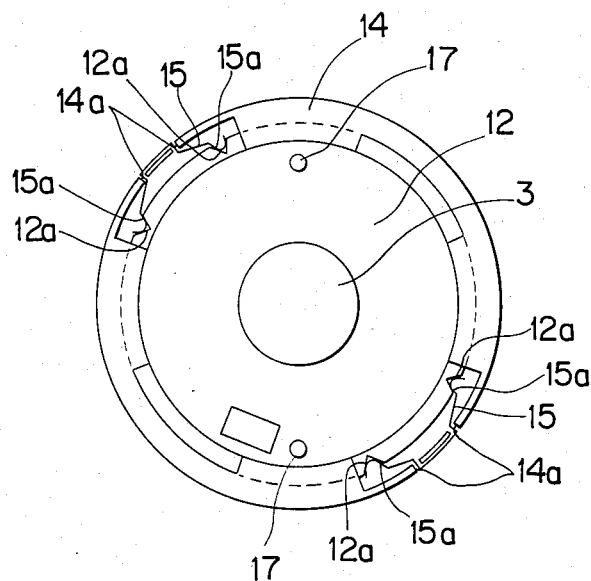
FIG. 5 is likewise a front view illustrating a base and a stopper of FIG. 3.
Figure 6:
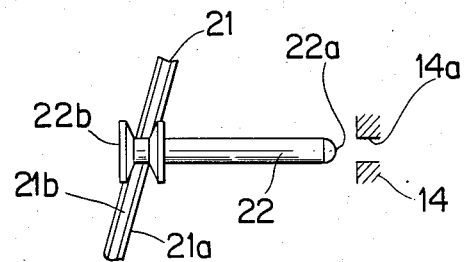
FIG. 6 is a side view illustrating a contacting state of the cam plate and a slide pin.
Figure 7:
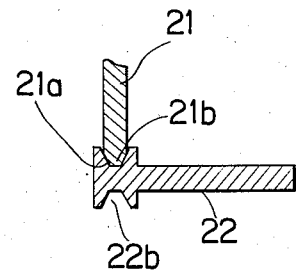
FIG. 7 is a sectional view of the above but showing only a portion which is material to the invention.
Figure 8:
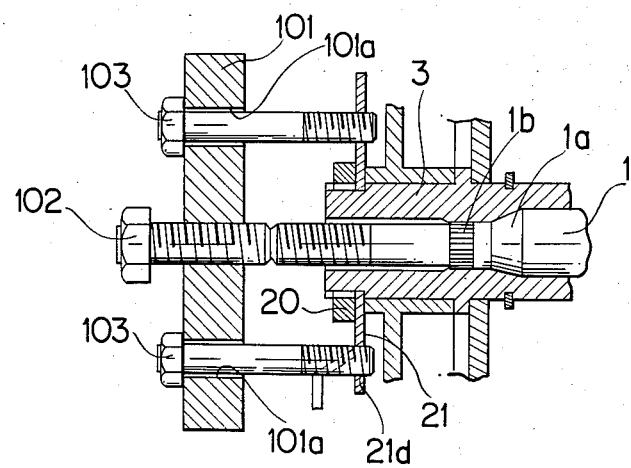
FIG. 8 is a sectional view illustrating a jig for removal when in use.

Referring first to FIG. 3 through FIG. 8 a first prefered embodiment of the invention will be described. Since the numerals which are identical with those in FIGS. 1 and 2 represent identical parts, description thereof will be avoided.

12 denotes a base mounted on a rear portion 3a of a boss 3 in such a manner as to be fixed with respect to the axial direction by C-rings 13, 13' but free with respect to the rotary direction. A stopper 14 is rotatably mounted on the outer periphery of said base 12.

Stopper 14 is formed with recesses 14a, in each of which a leaf spring 15 having folded portions 15a at the both ends for engagement is disposed, said folded portions 15a being engaged with a recess 12a of the base 12.

Also, base 12 is formed with holder holes 12b, in which springs 16 and coupling pins 17 are contained. Said coupling pins 17 are biased in the backward direction by the springs 16 and rested at the tip portions thereof in coupling recesses 18a of a steering column body 18 which contains a lever combination switch (not illustrated) therein. Since the steering column body 18 is not rotated, neither is rotated the base 12 even when the boss 3 is rotated.

Since the base 12 is not rotated and held in a standstill state, the stopper 14, which is engaged with the base 12 by virtue of the coupling between the recesses 12a and the folded portions 15a of the leaf springs 15, is not rotated either. However, when the stopper 14 is forced to rotate, said folded portions 15a will be disengaged from the recesses 12a resisting the biasing force of the leaf spring 15. As a result, the stopper 14 becomes rotatable.

19 denotes a pin holder mounted on the boss 3 in such a manner as to be fixed with respect to the axial direction but free in the rotary direction by a cam plate 21 which is secured to a front portion 3b of the boss 3 by a nut 20. Pin holder 19 comprises a ring-shaped boss portion 19a and a thick portion 19c formed with through-holes 19b for allowing a plurality of slide pins 22 to penetrate therethrough. A steering pad 6 equipped with switches and display is mounted on pin holder 19.

Stopped 14 is formed with a plurality of coupling recesses 14a opposite to said through-holes 19b. The chamfered portions 22a at the tips of said slide pins 22 which are penetrated throughout the through-holes 19b are rested in the coupling recesses 14a.

Also, the slide pins 22 are provided at the other end portions with tapered ring-shaped grooves 22b. Cam plate 21 is formed with a cam face 21b which is tapered 21a at the outer end portion and formed of a synthetic resin. Cam face 21b is fitted by the ring-shaped grooves 22b. Slide pins 22 are slided to and fro within the through-holes 19b according to the configuration of the cam face 21b.

The cam face 21b is formed in such configuration as that at least one of the slide pins 22 are pushed in at the maximum extent and after the adjacent slide pins 22 are pushed in at the maximum extent, they are retreated backwardly. When the slide pins 22 are pushed in at the maximum extent, the tip portions thereof are inserted into the coupling recesses 14a of the stopper 14. The tip portions of the slide pins 22 are provided with the chamfered portions 22a, so that the tip portions will not hit the marginal portions of the coupling recesses 14a when they enter.

Furthermore, since the outer end portion of the cam face 21b is tapered, 21a and the ring-shaped grooves 22b of the slide pins 22 are tapered as well, the contact between them for sliding the slide pins 22 does not constitute a point contact even at the slant portion of the cam face 21b, thus enabling smooth movement thereof. Moreover, since the cam face 21b is formed of a synthetic resin, the sliding resistance between them is comparatively small. As a result, smooth movement of the slide pins 22 is obtained and extraordinary wear can be prevented.

The boss plate 2a of the steering wheel 2 is fixedly attached to the boss 3, and an inner projection 21c of the cam plate 21 is inserted into its key grooves and fixedly secured by a nut 20. As a result, when the steering wheel 2 is rotated, the boss 3 is rotated to further rotate the cam plate 21.

However, since the tip portions of a part of the slide pins 22 are inserted into the coupling recesses 14a of the stopper 14 as mentioned above, the pin holder 19 is not rotated. On the other hand, since a part of the slide pins 22 are withdrawn into the through-holes 19b, the boss plate 2a of the steering wheel can be rotated through that portion.

A tapered portion 1a and a knurling portion 1b of the steering shaft 1 are meshed by the internal diameter of the boss 3, which is securely fastened to the steering shaft 1 by a nut 23. As a result, since the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft 1 by means of a spring 24. The cancel cam 25 is urged to engage with the boss 3 by the biasing force of the springs 24, so that when the steering wheel 2 rotates, the cancel cam 25 is actuated to extinguish turn signal lamps.

In this way, since there are mounted on the boss 3 the base 12 supporting the stopper 14, the pin holder 19 and the cam plate 21, these mechanisms for rotating the steering pad 6, and the steering wheel 2 can be removed by loosening the nut 23.

Consequently, when in assembly, after these mechanisms and the steering wheel 2 are mounted on the boss 3, the boss 3 is fitted on the steering shaft 1. Then, the base 12 is rotated to bring the coupling pins 17 in agreement with the coupling recesses 18a, and the pins 17 are urged to couple with the recesses 18a by means of the force of the springs 16, so that the base 12 is stopped rotating. Thereafter, the nut 23 is screwed tight to complete the assembly.

As seen in the above, this mechanism can be conveniently mounted and removed by merely attaching and detaching the boss 3. Also, the same can be easily dismantled and repaired. In addition, the coupling between the coupling pins 17 and the coupling recesses 18a can be easily performed.

Furthermore, in order to facilitate an easy removal of the boss 3 which is seated on the steering shaft 1 at the tapered portion 1a, the following jig, (FIG. 8) for removal may be employed.

The jig for removal comprises a jig body 101, a main screw 102 threadedly engaged with the center of the jig body 101, and fixing screws 103 for threading into holes 101a formed in the jig body 101. The cam plate 21 is provided with tapped holes 21d for threadedly engaging with said fixing screws 103.

In operation for removing the boss 3 from the steering shaft 1 by using said removing jig, the fixing screws 103 are threaded into the holes 101a of the jig body 101 for threadedly engaged with the tapped holes 21d of the cam plate 21, thereby fixing the jig body 101 to the cam plate 21.

As a result, the main screw 102 is brought into alignment with the steering shaft 1. As the main screw 102 is tightened, the jig body 101 is pushed away in the departing direction with respect to the steering shaft 1, and the cam plate 21 is moved in the removing direction with respect to the axial direction. Since the cam plate 21 is fixedly secured to the boss 3 by the nut 20, the boss 3 can thus be removed.

Furthermore, an inner bore 14b is defined by the base 12 and the stopper 14, and an inner bore 19d for the pin holder 19 is formed, with the boss plate 2a interposed therebetween. Slip rings A and B as will be described hereinafter are accommodated in bores 14b and 19d, respectively.

Referring now to FIGS. 9 and 10, there will be described hereunder a slip ring accommodated within the inner bore 19d of the pin holder 19, the slip ring being adapted to connect the switches and display of the steering pad 6 to the corresponding circuits on the vehicle body side.

A base portion 26 is provided at the front face of its flange base 26a with an outer circumferential wall 26c for defining a space 26b for containing a lead plate 29a of a fixed contact 29 as will be described hereinafter, and with an inner circumferential wall 26d formed with a pawl substantially full around the circumference at the tip end portion thereof which is to be relatively, rotatably engaged with the inner periphery of a through-hole 27b of a movable cover 27, walls 26c and 26d being erected upright from the base portion 26. $26d_2$ denotes slits formed in the inner wall 26d for resiliently engaging said pawl $26d_1$.

Printed circuit board 28 is formed at the rear face of the flange base 26a. A lead plate 29a of the fixed contact 29 leading out through the space 26b is soldered at the tip portion thereof with respect to the printed circuit board 28.

Fixed contact 29 in ring shapes and formed of conductive material. The contacts 29 and ring-shaped spacers 30 formed of insulated material such as plastic or the like are arranged in several layers alternatively in the axially elongated direction to form a current collecting body 31.

Each of fixed contacts 29 is provided, at its inner circumference, with a lead plate 29a folded in the direction toward the flange base 26a. The lead plates 29a are arranged in such a manner as to leave suitable angles therebetween in order not to be mutually short-circuited.

Current collecting body 31 is accommodated outside of the outer circumferential wall 26c of the base portion 26.

Slites 29c, are formed in the outer circumferential wall 26c of said base portion 26 in such a manner as to correspond to the respective lead plates 29a of the fixed contacts 29. The arrangement being such that when the current collecting body 31 is mounted, the adjacent lead plates 29a of the fixed contacts 29 are inserted into the respective slits $26c_1$ thereby determining the right mounting position of the current collecting body 31 with respect to the outer circumferential wall 26c. That is, since the mounting angles are determined in this way, the lead plates 29a will not be short-circuited.

The respective lead plates 29a of the fixed contacts 29 are led out through leading-out holes (not shown) formed in the flange base 26a of the space 26b and guided to the rear face of the printed circuit board 28, thereby being soldered and connected to a connector 33 through a lead 32.

Fixing plate 34 is adapted to prevent the current collecting body 31 from escaping. Fixing plate 34 is provided with through-holes 34a for receiving screws therein, the through-holes 34a being formed in the position corresponding to tapped holes $26c_3$ of the ribs $26c_2$ formed on the outer circumferential wall 26c. Screws 35 are threaded into the through-holes 34a and tapped holes $26c_3$ for mounting the plate 34 on the outer circumferential wall 26c, thereby preventing the current collecting body 31 from escaping.

A movable cover portion 27, or a case is put on the outer circumferential wall 26c of the base portion 26 of the fixing system in such a manner as to be relatively movable with respect to each other.

Movable contacts 36 resiliently and slidingly contact the respective fixed contacts 29. Each of the movable contacts 36 is formed of contacting portions 36a, 36a for contacting the fixed contact 29 and a portion 36b. The contacting portions 36a, 36a are formed by folding both end portions of a conductive spring material formed of a plain plate or a wiring material.

The portion 36b of the movable contact 36 is inserted into coupling grooves 27c, 27c formed in parallel with respect to each other in the elongated direction in the side face of the movable cover portion 27. Simultaneously, the pawl $26d_1$ formed substantially whole around the circumference at the tip end portion of the inner peripheral wall 26d of the base portion 26 is engaged with the inner periphery of the through-hole 27b of the movable cover portion 27.

The leads 37 are soldered with respect to portions 36b of the movable contacts 36. The collected bundle of the leads 37 is fixed by a band member 27d provided on the outer face of the movable cover portion 27, and a connector 38 connected to the foremost end portion thereof.

Since the slip ring B, which is to be aoommodated in the inner bore 14b defined by the base 12 and stopper 14, is constituted as same as the slip ring A, description thereof will be eliminated.

The connector 38 of the slip ring A within the pin holder 19 is connected to the connector 38 of the slip ring B within the base 12 and stopper 14. Also, the connector of the lead 39 which is connected to the switches and display on the steering pad 6, is connected to the connector 33 of the slip ring A within the pin holder 19. Further, the connector of the lead 40, which is connected to the circuit of the vehicle body side, is connected to the connector 33 of the slip ring B within the base 12 and stopper 14.

Now, with the above constitution, when the steering wheel 2 is rotated, the boss 3 is also rotated to further rotate the steering shaft 1, thus enabling the turning operation of a vehicle. On the other hand, the base 12, stopper 14 and pin holder 19 are held stationary as mentioned above, thereby maintaining the steering pad 6 in normal position.

When the slide pins 22 tended to rotate together with the boss plate 2a due to abutment between the boss plate 2a and the slide pins 22, or due to scoring of the slide pins 22 with respect to the cam portion 21b of the cam plate 21, the base 12 and the stopper 14 are brought out of engagement with respect to each other as mentioned above. As a result, the pin holder 19 becomes rotatable, thus preventing the locking of the boss plate 2a, or the steering wheel 2.

Since the lead 40 connected to the circuit of the vehicle side is penetrated through the base 12 which is not rotated even at that time, the lead 40 is not wound around or tangled. Therefore, even if the stopper 14 and the pin holder 19 are rotated, the smooth rotation of the steering wheel 2 will not jeopardized, nor will the rotation of the stopper 14 and the holder 19 result in such troubles as cutting of the leads or the like.

Figure 11:
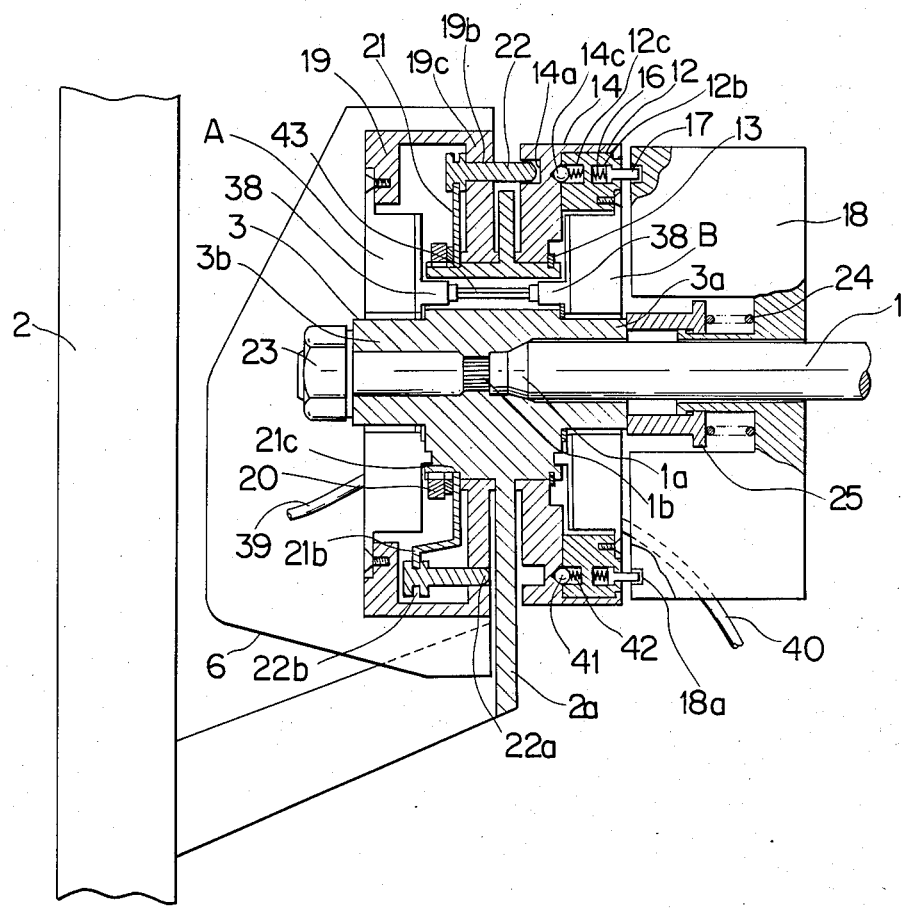
FIG. 11 is a sectional view illustrating a second embodiment of the present invention.

Nextly, a second preferred embodiment of the present invention will be described with reference to FIG. 11, wherein the numerals which are identical with those in the first embodiment designate the identical parts.

Also, since the identical numerals with those in FIGS. 1 and 2 designate the identical parts, duplicate description will be eliminated.

Stopper mounted 14 on a rear portion 3a of a boss 3 is mounted in such a manner as to be fixed with respect to the axial direction by a C-ring 13 but free with respect to the rotary direction. A base 12 is rotatably engaged with the stopper 14 at the rear portion.

The base 12 is formed with a holder 12c in which a coupling ball 41 and a spring 42 are accommodated. Coupling ball 41 is coupled to a coupling recess 14c.

The base 12 is also formed with a holder hole 12b, in which a spring 16 and a coupling pin 17 are accommodated. Coupling pin 17 is biased in the backward direction by the spring 16 and rested at the tip portion in a coupling recess 18a of a steering column body 18 which contains therein a lever combination switch (not illustrated). Since the steering column body 18 is not rotated, neither is base 12 even when the boss 3 is rotated.

Since the base 12 is not rotated and held in a fixed position stopper 14, which is coupled to the base 12 through the coupling ball 41, and the coupling recess 14c does not rotate. However, when the stopper 14 is forced to rotate, the coupling ball 41 is escaped from the coupling recess 14c, thereby allowing the stopper 14 to become free. As a result, the stopper 14 becomes rotatable.

Pin holder 19 is mounted on the boss 3 in such a manner as to be fixed with respect to the axial direction but free in the rotary direction by a cam plate 21 which is secured to a front portion 3b of the boss 3 by a nut 20. Pin holder 19 comprises a thick portion 19c formed with through-holes 19b for allowing a plurality of slide pins 22 to penetrate therethrough. A steering pad 6 equipped with switches and display is mounted on said pin holder 19.

Stopper 14 is formed with a plurality of coupling recesses 14a opposite to through-holes 19b. The chamfered portions 22a at the tips of the slide pins 22 penetrating through said through-holes 19b and are rested in the coupling recesses 14a.

Also, the slide pins 22 are provided at the other end portions with tapered ring-shaped grooves 22b. Cam plate 21 is formed with a cam face 21b formed of a synthetic resin and tapered 21a at the outer end portion. Cam face 21b is fitted by the ring-shaped grooves 22b. Thus, the slide pins 22 slided to and fro within the through-holes 19b according to the configuration of the cam face 21b.

The cam face 21b is formed in such configuration as that at least one of the slide pins 22 are pushed in at the maximum extent, and after the adjacent slide pins 22 are pushed in at the maximum extent, they are retreated backwardly. When the slide pins 22 are pushed in at the maximum extent, the tip portions thereof are inserted into the coupling recesses 14a of the stopper 14. The tip portions of the slide pins 22 are provided with the chamfered portions 22a, so that the tip portions will not hit the marginal portions of the coupling recesses 14a as they enter.

Furthermore, since the outer end portion of the cam face 21b is tapered, 21a and the ring-shaped grooves 22b of the slide pins 22 are tapered, the contact between them for sliding the slide pins 22 will not constitute a point contact even at the slant portions of the cam face 21b, thus obtaining smooth movement. Moreover, since the cam face 21b is formed of a synthetic resin, a sliding resistance between them is comparatively small. As a result, the smooth movement of the slide pins 22 is obtained and extraordinary wear between the cam face 21b and the slide pins 22 can be prevented.

The boss plate 2a of the steering wheel 2 is fixedly attached to the boss 3, and an inner projection 21a of the cam plate 21 is inserted into its key groove and fixedly secured thereto by a nut 20. As a result, when the steering wheel 2 is rotated, the boss 3 is rotated to further rotate the cam plate 21.

However, since the tip portions of a part of the slide pins 22 are inserted into the coupling recesses 14a of the stopper 14, as mentioned above, the pin holder 19 is not rotated. On the other hand, since a part of the slide pins 22 are withdrawn into the through-holes 19b, the boss plate 2a of the steering wheel 2 can be rotated therethrough.

A tapered portion 1a and a knurling portion 1b of the steering shaft 1 are meshed by the internal diameter of the boss 3, which is securely attached to the steering shaft 1 by a nut 23. As a result, since the steering shaft 1 and the boss 3 are integrated, the rotation of the steering wheel 2 is transmitted to the steering shaft 1.

Within the steering column body 18 containing a lever combination switch, a cancel cam 25 is mounted on the steering shaft by means of a spring 24. The cancel cam 25 is urged to engage with the boss 3 by the biasing force of the spring 24, so that when the steering wheel 2 is rotated, the cancel cam 25 is actuated to extinguish turn signal lamps.

In this way, since there are mounted on the boss 3 the base 12 which supports the stopper 14, the pin holder 19 and the cam plate 21, these mechanisms for rotating the steering pad 6 and the steering wheel 2 can be removed by loosening the nut 23.

Consequently, when in assembly, after these mechanisms and the steering wheel 2 are mounted on the boss 3, the boss 3 is fitted on the steering shaft. Then, the base 12 is rotated to bring the coupling pins 17 in agreement with the coupling recesses 18a, and the pins 17 are urged to couple with the recesses 18a by means of the force of the springs 16, so that the base 12 is stopped rotating. Thereafter, the nut 23 is screwed tight to complete the assembly.

Furthermore, slip rings A and B are accommodated, respectively, in an inner bore 14b which is defined by the base 12 and the stopper 14 and opened up toward the steering column body 18 side and in an inner bore 19d opened up toward the steering pad 6 side of the pin holder 19. Switches and display on the steering pad 6 are thus connected with the circuit of the vehicle body side.

Since these slip rings A and B are identical with those in the first embodiment, duplicate description will be eliminated.

A connector 38 of the slip ring A within the pin holder 19 and another connector 38 of the slip ring B within the base 12 and the stopper 14 are connected to each other by a harness 43 with connector. The connector 33 of the slip ring A, within the pin holder 19, is connected by the connector of the lead 39 which is connected to the switches and display on the steering pad 6. Further, the connector 33 of the slip ring B within the base 12 and the stopper 14 is connected by the connector of a lead 40 which is connected to the circuit of the vehicle body side through the base 12.

In this second embodiment since the operation of the steering wheel 2 during its rotation and when its rotation is prevented is the same as that described with respect to the first embodiment, duplicate description will be eliminated.

Figure 12:
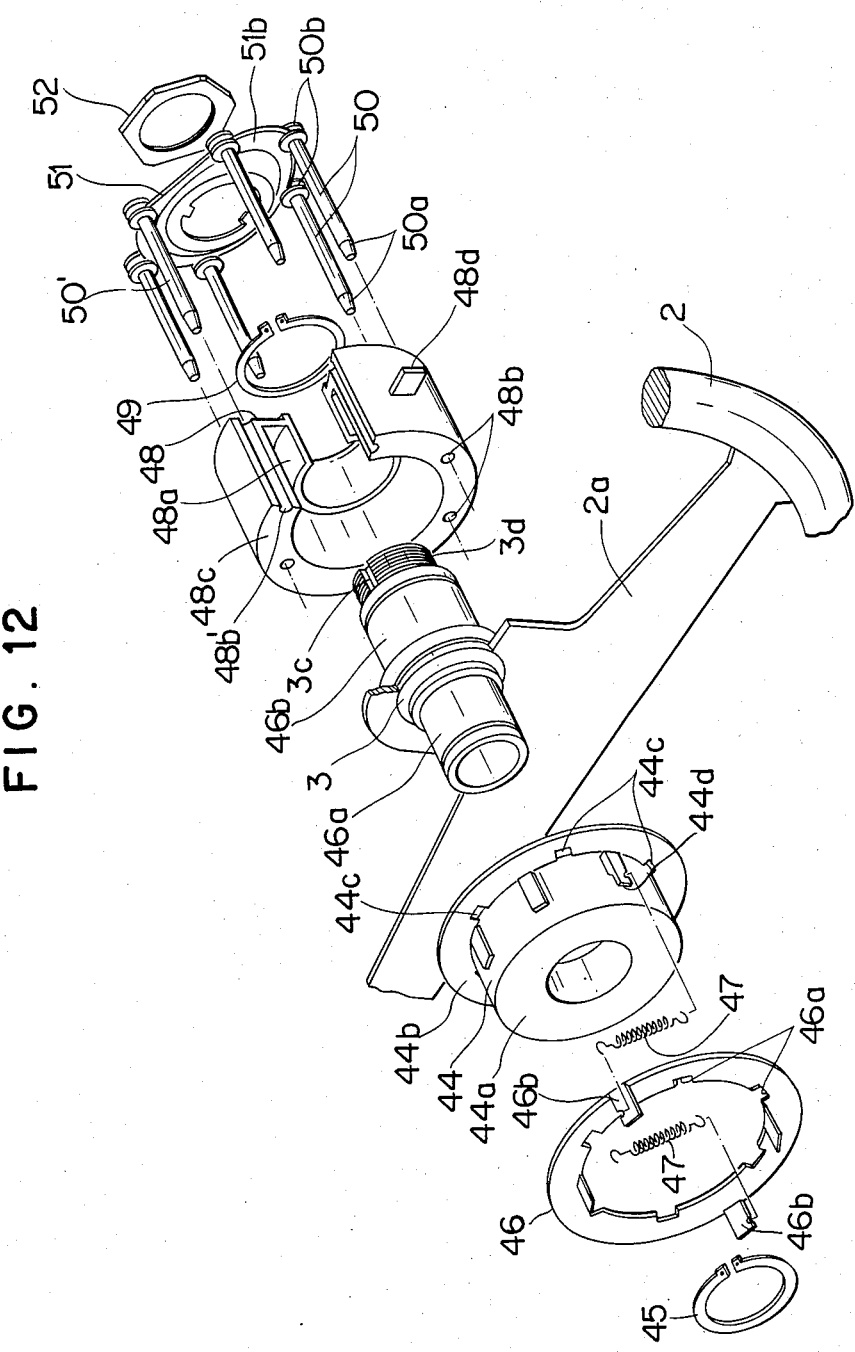
FIG. 12 is an exploded perspective view illustrating a third preferred embodiment of the present invention.
Figure 13:
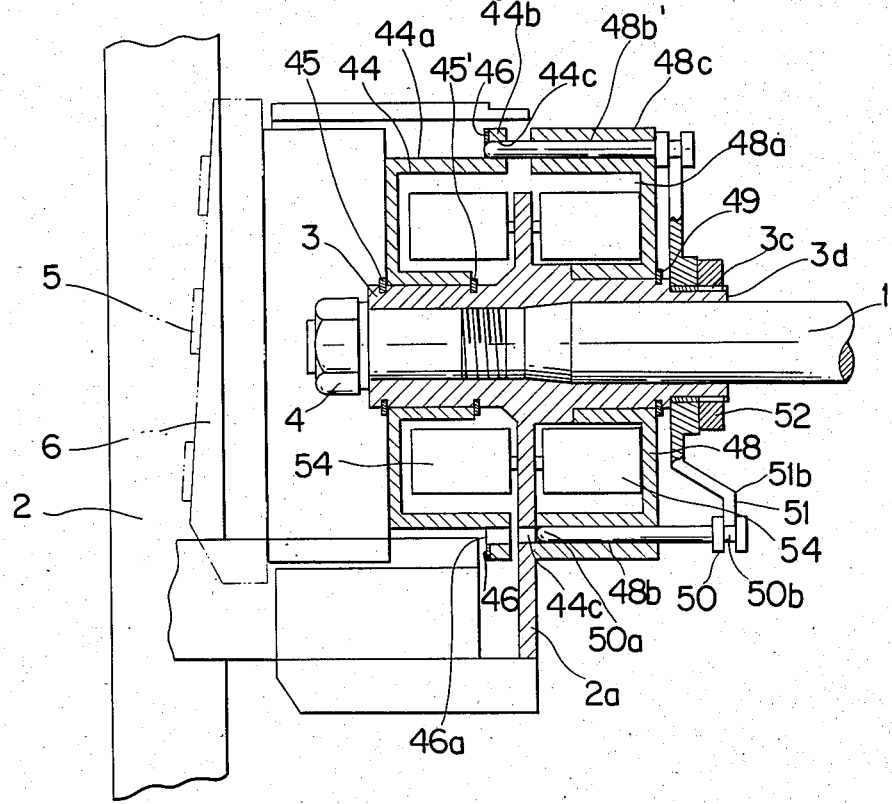
FIG. 13 is a vertical sectional view illustrating the above but in the assembled state.

Referring to FIGS. 12 and 13, a third preferred embodiment of the present invention will be described, wherein the numerals which are identical with those in FIGS. 1 and 2 represent identical parts and therefore duplicate description will be avoided.

Base pad 44 is mounted on the front portion 3b of the boss 3 in such a manner as to be fixed in the axial direction by C-rings 45, 45' but free in the rotary direction. Base pad 44 comprises a ring-shaped accommodating portion 44a in which a steering switch connecting device is accommodated as will be described later and a flange portion 44b is integrally formed therewith at the outer opening portion. The flange portion 44b is equally spacedly with pin inserting holes 44c (6 pcs. in the illustrated embodiment) The accommodating portion 44a is formed with spring coupling portions 44d at two places opposite with respect to each other on the outer periphery.

Base ring 46 is fitted on the outer periphery of the accommodating portion 44a. Base ring 46 is formed with pin inserting holes 46a corresponding to the pin inserting holes 44c at the inner circumferential margin. Also, at two positions opposite with respect to each other on the inner circumferential margin thereof, projecting pieces 46b are formed for retaining springs. Springs 47 are retained and stretched between the respective projecting pieces 46b and the spring coupling portions 44d of pad base 44 to normally clamp and hold the pins inserted.

Pin holder 48 is mounted on the rear portion 46a of the boss 3 in such a manner as to be fixed with respect to the axial direction by a C-ring 49 and free in the rotary direction. Pin holder 48 comprises a ring-shaped accommodating portion 48a and a thick portion 48c in which pin inserting holes 48b corresponding to the pin inserting holes 44c of said pad base 44 are formed. Also, the outer wall of the thick portion 48c is provided with projecting pieces 48d by means of which the pin holder 48 is fixed to the steering column side. Consequently, the pin holder 48 is held in the fixed state irrespective of the rotation of the steering wheel 2. One or two pin inserting holes among the 6 pin inserting holes are formed in larger or smaller diameters compared with those of the other holes. In FIG. 12, only the inserting hole 48b' is illustrated as an example having a larger diameter than others.

Pin 50, is for inseration into the pin inserting holes 48b of pin holder 48. The respective pins 50 are formed in the shapes of acute angles at the tip portions 50a. On the other hand, the rear end portions of the pins 50 are formed with grooved portions 50b in which a cam plate 51 is inserted. In the illustrated embodiment, only the pin 48b' among 6 pins which are to be inserted into the pin inserting hole 48b' has a larger diameter than others.

Cam plate having 51 has projecting pieces 51a adapted to be inserted into the grooves 3c of the boss 3 for preventing the rotation of the cam plate 51. Cam plate 51 is fixed to the boss 3 by a nut 52 which is threadedly engaged with a threaded portion 3d of the boss 3. The grooved portions 50b of pin 50 are engaged to the outer peripheral portion 51b of cam plate 51. The outer peripheral portion 51b is formed so that at least one of the 6 pins 50 are pushed in at the maximum extent and after the adjacent pins are pushed in at the maximum extent, the pins are retreated.

When the pins 50 are pushed in at the maximum extent by the cam plate 51, the tip portions of the pins 50 are inserted into the pin inserting holes 44c of the pad base 44 and the pin inserting holes 46a of the base ring 46. Also, the cam plate 51 is mounted on the boss 3 in such a manner so that when the pins 50 are retreated at the maximun extent, the boss plate 2a passes therethrough.

With the above construction, since at least one pin 50' is inserted into the inserting holes 48b' at the maximum extent by the cam plate 51, the tip portion of pins 50' are inserted into the inserting holes 44a and 46a of the pad base 44 and base ring 46.

Because the pins 50, in the position where the boss plate 2a is positioned, are retreated at the maximun extent by the cam plate 51, the tip portions of the pins 50 are rested in the pin inserting holes 48b, thereby allowing the rotation of the boss plate 2a.

Figure 14:
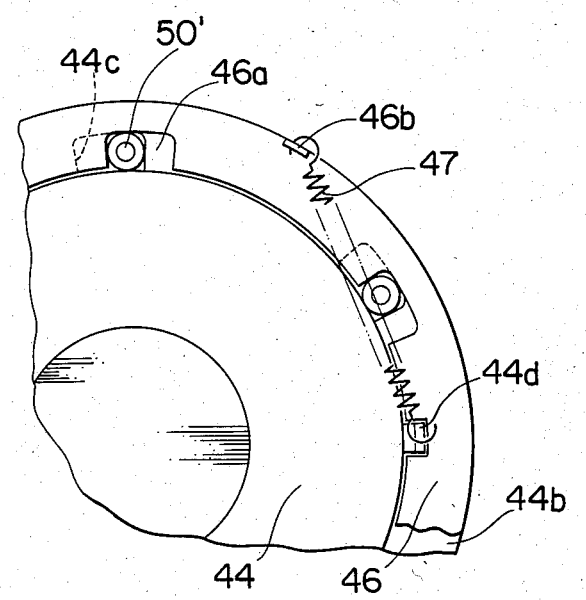
FIG. 14 is a plan view illustrating the relation between a pad base and a base ring.

When the steering wheel 2 is rotated since the cam plate 51 is rotated through the boss 3, the pins 50 which are adjacent to said pins 50' are pushed out by the cam plate 51 and inserted into the pin inserting holes 46a of the base ring 46 through the pin inserting holes 44a of the pad base 44. At this moment, because the tip portions of the pins 50 are formed in the shapes of acute angles and because the pin inserting holes 44a and 46a of the pad base 44 and base ring 47 are formed larger in diameter compared with pins 50, the pins 50 can be smoothly inserted into the pin inserting holes 44c and 46a even if there should be somewhat aberrations in the parts concerned. If the gaps between the pins 50 and the pin inserting holes 44c are large, the pad base 44 is rotated slightly at the time when the pins 50 are inserted. In the illustrated embodiment of the present invention, in order to make the gaps between the pins 50 and the pin inserting holes 44c substantially small, the base ring 46 is employed and at the same time, springs 47 are stretched between the base ring 46 and the pad base 44 to clamp and hold the pins 50 between the base ring 46 and the pad base 44, thus eliminating the undesirable rattling and facilitating the insertion of the pins 50 into the pad base 44 (see FIG. 14).

As mentioned in the foregoing, as the steering wheel 2 rotates, the pins 50 are inserted, one after another, into the pin inserting holes 44c of the pad base 44 and at the same time, when one of the pins 50 is inserted into one of the pin inserting holes 44c, the pin which was already inserted is forced out. As a result, the rotation of the boss plate 2a is not prevented by the pins 50 and the pad base 44 is fixed relative to the pin holder 48. As a result, since the pin holder 48 is fixed to the vehicle body side where the steering column is positioned, the pad base 44 is also fixed to further fix the steering pad 6 which is fixed to the pad base 44.

As mentioned in detail in the foregoing, according to the present invention, because the power transmission mechanism is constituted in such a manner so that the fixed member connected to the steering column side and the fixed member connected to the steering pad side are held in a coupled state by means of at least one slide pin among several slide pins, and the slide pins in the portion where the boss plate passes due to the rotation of the steering wheel are withdrawn by the cam, the resistance due to the contact between the cam and the slide pins is applied without any fluctuation irrespective of the rotary angles of the steering wheel when the steering wheel rotates.

As a result, since no loads are fluctuated and no impacts are applied during the operation of the steering wheel, a smooth operation of the steering wheel is ensured without an unpleasant feeling on the part of the driver.

Furthermore, because at least either cam or slide pins are formed at the contacting face or faces of a synthetic resin, the contact is made either between a synthetic resin and a metal, or between synthetic resins. Therefore, the sliding resistance is small and smooth, which eventually makes the steering operation lightly. In addition, the sliding resistance is not varied greatly even if the oil supply or lubrication is short.

Furthermore, because the sliding means according to the present invention does not cause scoring, etc., such disadvantages as scoring, burning and/or extraordinary wear can be avoided, thus improving the reliability on the invented apparatus extensively.

What is claimed is:

1. A steering wheel switch pad apparatus for mounting on a boss at the steering wheel end of a steering shaft and within the circumference of the steering wheel, said steering wheel being mounted on a boss plate fixed to said boss inward of said end of said shaft, said boss being fixed to said steering shaft for turning said steering shaft when said boss and said boss plate are turned by said steering wheel, said switch pad apparatus comprising:
    a cam plate fixed to the end of said boss adjacent said steering wheel end of said shaft for rotation with said boss when said boss and said steering shaft are turned by said steering wheel;
    a pin holder mounted on said boss intermediate said cam plate and said boss plate, said pin holder having at least two pin guide holes extending therethrough in substantial alignment with the axis of said steering shaft, each of said pin holes having a pin therein for axial movement therethrough, each of said pins having means at one end of said pin extending outwardly from the cam plate end of said pin holder for engaging said cam plate and means at the other end for projecting axially beyond the rotating path of said boss plate when said pin is advanced by said cam plate and for retracting axially out of said rotating path of said boss plate when said pin is retracted by said cam plate; and
    a base having pin guide holes therein aligned with said pin guide holes in said pin holder, said base being mounted on said boss at the side of said boss plate opposite to the side of said boss plate where said pin holder is mounted and said cam plate is fixed to said boss, said pin guide holes in said base receiving the ends of said pins projecting axially beyond the rotating path of said boss plate by said cam plate when said boss and said boss plate are rotated by the turning of said steering wheel to hold said projecting pins and said pin holder from rotating as said boss and boss plate are turned by said steering wheel.

2. A steering switch pad apparatus as claimed in claim 1, wherein said cam plate is formed with tapped holes to provide engagement with suitable steering apparatus removing means.

3. A steering switch pad apparatus, as recited in claim 1, in which said cam plate is of synthetic resin material.

4. A steering switch pad apparatus, as recited in claim 1, including means for releasing said base, said pins and said pin holder for rotation with said boss, said boss plate and said steering wheels, if said cam plate fails to retract said projecting pins when said steering wheel is rotated and said projecting pins are engaged by said turning boss plate.

5. A steering switch pad apparatus, as recited in claim 4, in which said releasing means includes a base ring having locking pin holes and locking pins on said base projecting into said locking pin holes.

6. A steering switch pad apparatus according to claim 5, further including a spring stretched between said base ring and said base.

* * * * *